Dec. 26, 1961 — I. W. KLEIN — 3,014,575
JOINTED CONVEYOR
Filed Dec. 15, 1958 — 2 Sheets-Sheet 1
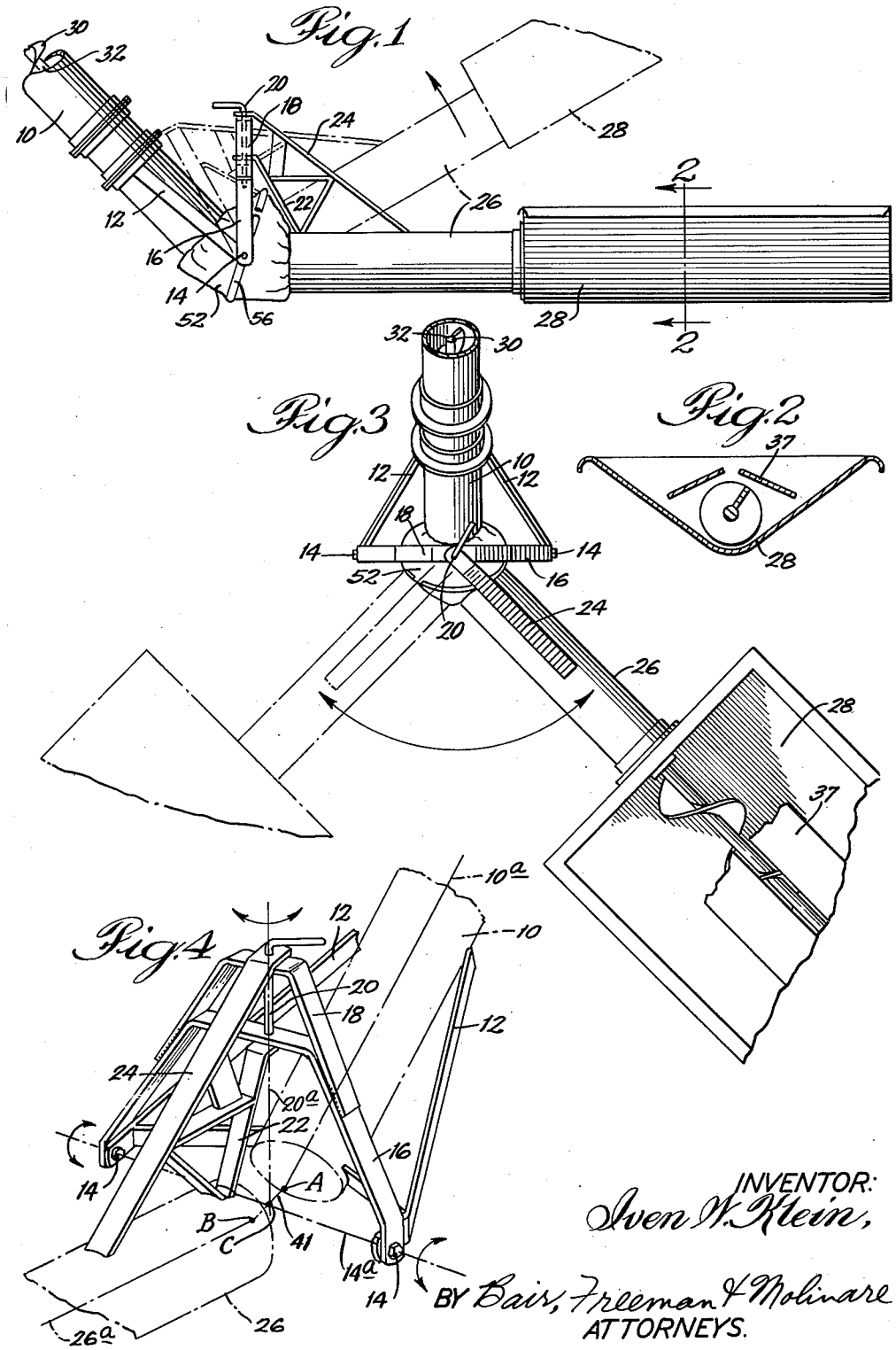
INVENTOR:
Iven W. Klein,
BY Bair, Freeman & Molinare
ATTORNEYS.

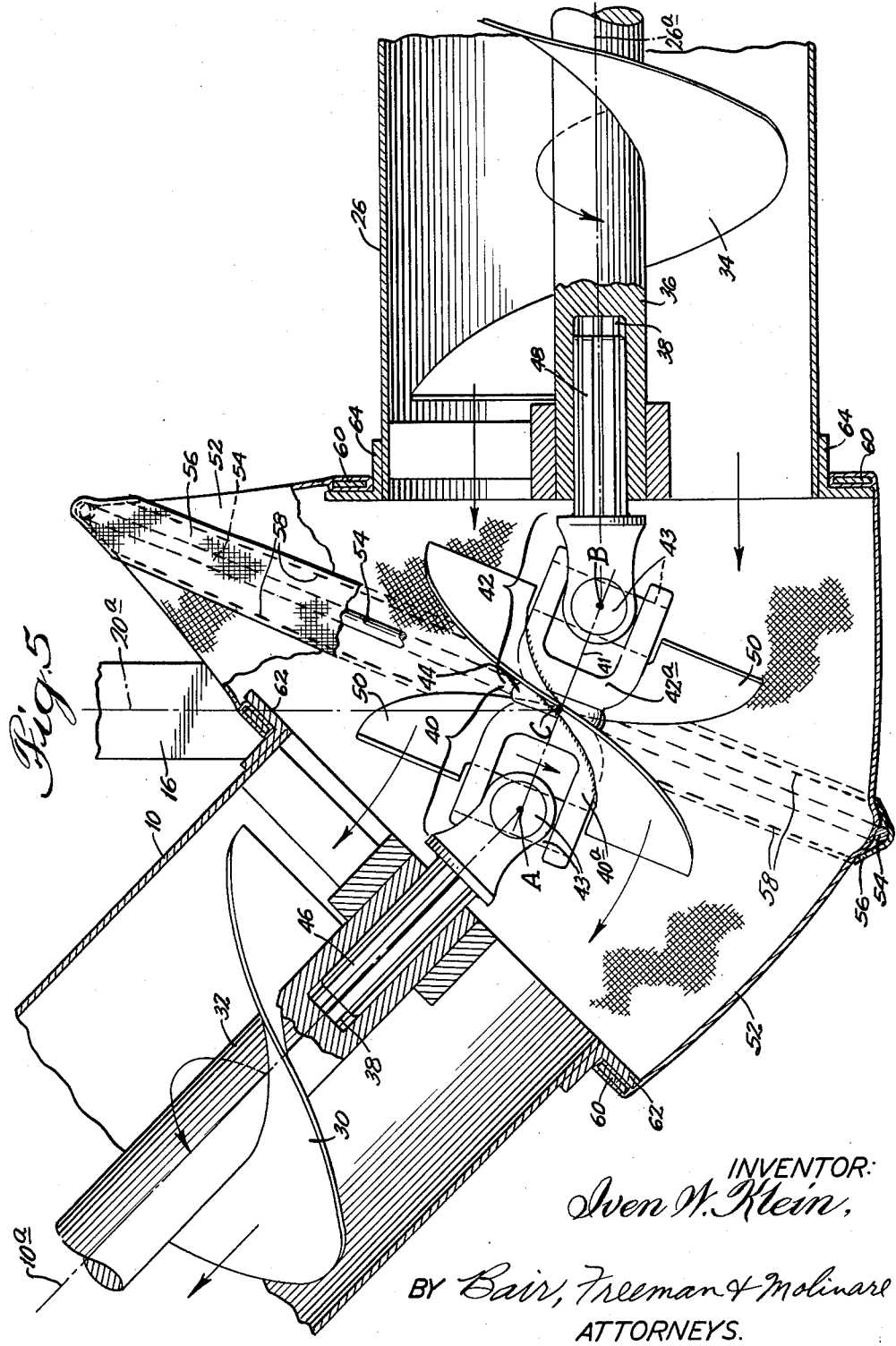

United States Patent Office 3,014,575
Patented Dec. 26, 1961

3,014,575
JOINTED CONVEYOR
Iven W. Klein, Hull, Iowa, assignor to Sioux Steel Company, Sioux Falls, S. Dak., a corporation of Delaware
Filed Dec. 15, 1958, Ser. No. 780,382
10 Claims. (Cl. 198—213)

This invention relates to a jointed conveyor particularly adapted for auger type elevators for grain and the like, and for connection of a swinging hopper or drag section to the lower end of an auger elevator so that the hopper can be swung sidewise in either direction with respect to the elevator to which the hopper delivers grain, and such elevator or the hopper may be varied as to inclination in the vertical plane, all while the auger is in operation and without interfering with such operation.

One object of the invention is to provide a jointed auger type conveyor in which two auger tubes are so connected together that one will continuously deliver grain to the other regardless of the angular position of one relative to the other within the range of their possible angular adjustment, a novel universal joint with auger flights thereon being used for operatively connecting the augers in the two auger tubes with each other and effecting transport of the grain through the joint of the conveyor from a delivery auger in one tube to a receiving auger in the other tube.

Another object is to provide a universal joint connecting frame between the two auger tubes, which frame has a pair of intersecting axes, one substantially vertical and the other substantially horizontal, both axes passing approximately through the center of the universal joint connection between the two auger shafts so as to hold the parts in the desired operative relation and permitting angular adjustments while the conveyor continues to operate.

Still another object is to provide a canvas boot so designed as to cover the intervening space between the adjacent ends of the auger tubes, thus protecting the grain from outside dirt and other contamination and guiding it from one auger tube to the other without interference with the adjustment of the jointed conveyor as desired during the operation thereof.

A further object is to provide a gimbal yoke type of connection between the two auger tubes to maintain the pivotal connection of one to the other substantially on the axis of a universal joint connection between the two auger shafts so as to minimize the variation in distance between the adjacent ends of the auger shafts in the auger tubes.

With these and other objects in view, my invention consists in the construction, arrangement and combination of the various parts of my jointed conveyor, whereby the objects above contemplated are attained as hereinafter more fully set forth, pointed out in my claims and illustrated in detail on the accompanying drawing, wherein:

FIG. 1 is a side elevation of a jointed conveyor embodying my invention;

FIG. 2 is a vertical sectional view through the hopper of the drag section thereof;

FIG. 3 is a plan view of the jointed conveyor;

FIG. 4 is a perspective view showing particularly the gimbal yoke connection between the auger tubes; and FIG. 5 is an enlarged vertical sectional view through the adjacent ends of two conveyor tubes and the boot that connects them together, and shows details of the mechanism within the boot.

On the accompanying drawings I have used the reference numeral 10 to indicate a main auger tube. The tube 10 is simply a customary elevator tube adapted to convey grain upward and into a container such as a grain bin, truck or the like. At the lower end of this main auger tube 10 is mounted a modified gimbal yoke arrangement bearing the reference numerals 12 to 24 respectively as will now be described.

A pair of horizontal-axis arms 12 are secured to the tube 10 as by welding or the like, the parts being preferably of steel and suitably braced as illustrated in FIG. 4. The outer ends of the arms 12 carry the horizontal axis of the gimbal yoke arrangement consisting of a pair of bolts 14. Yoke members 16 and 18 are suitably welded together and pivoted on the bolts 14 and constitute a vertical-axis frame of the gimbal yoke arrangement. A bracket consisting of a pair of vertical-axis arms 22 and 24 and suitable braces as illustrated in FIG. 4 is welded to a drag auger tube 26. The yoke 16—18 and the bracket 22—24 are pinned together by a vertical-axis pin 20.

From the construction of the parts just disclosed, it will be obvious that the elements 10 and 12 may pivot on the axis 14, or the elements 16, 18, 20, 22, 24 and 26 may do so, or the elements 12, 14, 16 and 18 may pivot on the axis 20 relative to the elements 22, 24 and 26 for a purpose which will hereinafter appear.

The drag auger tube 26 may terminate in a hopper 28. The drag auger 34 may have an auger guard 37 and a main auger shaft 32 are contained in the auger tube 20 while a drag section auger 34 and its shaft 36 are contained in the drag auger tube 26 and the hopper 28. The drag auger 34 may have an auger guard 37 over the auger 34 in the hopper 28. Instead of the drag auger 34 extending into the hopper 28, the hopper may be omitted and the auger may then extend into a corn crib, grain bin, or the like in which the auger will run freely and move the grain therefrom and into the lower end of the drag auger tube 26. These variations, however, form no part of my present invention.

The adjacent ends of the auger shafts 32 and 36 as shown in FIG. 5 are internally splined as indicated at 38. An operative connection is provided between from the shaft 32 to the shaft 36 consisting of a first universal joint 40 and a second universal joint 42 which are of the usual double-yoke type with connecting members 43 between them having cross axes at right angles to each other. The adjacent ends of the universal joints are connected together at 44 as by welding or the two yokes thus connected may be integrally forged as desired. The opposite ends of the universal joints 40 and 42 are provided with splined stubs 46 and 48 respectively to telescopically enter the internal splines 38 of the shafts 32 and 36. This type of connection permits some axial sliding, yet prevents relative rotation.

On the two yokes 40a and 42a of the joints 40 and 42, a universal joint flight 50 is provided which is of substantially the same character as the auger flights 30 and 34 and performs an important function as will hereinafter appear.

The adjacent ends of the auger tubes 10 and 36 are provided with flanges 62 and 64, and a flexible boot 52 of canvas or the like is associated therewith for enclosing the gap between these flanges as shown in FIG. 5. This boot has a supporting ring 54 in the form of a steel rod outside the boot and a canvas reinforcing strip 56 constitutes a band surrounding the ring 54. The band 56 is stitched to the boot 52 as indicated at 58 to hold the ring in place. The boot is in the form of a pair of truncated cones with their bases together and their truncated ends are reinforced by flat washer-like bands 60 just outside the flanges 62 and 64 to retain the end openings of the boot in proper association with the tubes 10 and 26.

The main auger 30 may be driven through a gear box such as shown in my copending application, Serial No. 752,782 filed August 4, 1958, so the shaft 32 will drive the dual universal joint 40—42. Thus by the use of this joint the elevator engine will drive the auger 34 in the drag section 26 despite a considerable misalignment of the two shafts 32 and 36.

*Practical operation*

In the operation of my jointed conveyor, it will be obvious that:

(1) The drag section 26 and its hopper 28 may pivot around the horizontal axis 14, or (2) Conversely the elevator tube 10 may be raised or lowered about this axis without any pivoting about the vertical axis 20, (3) Either tube 10 or 26 may pivot around the axis 20, (4) There may be pivoting on both axes.

Accordingly it is possible to universally move either of the tubes 10 or 26 to a desired position within its range of pivotal movement as afforded by the linkage or gimbal yoke arrangement disclosed. The angle of the main auger tube 10 may be changed either by raising or lowering the upper end of the elevator without disturbing the position of the hopper 28 or the drag section 26, and it will also be apparent that the hopper and drag section may move horizontally on the ground through a considerable angle without in any way disturbing the position of the main part of the elevator.

The pivot axes 14 and 20 are such that they extend through approximately the center lines of the two portions of the auger and intersect near the same point as the auger center lines. As disclosed in FIGS. 4 and 5, the axes 10a and 26a of the tubes 10 and 26 intersect the axis 41 of the universal joint 40—42 as indicated at A and B respectively, whereas the axes 14a and 20a of the horizontal bolts 14 and the vertical pin 20 intersect at C which also intersects the axis 41 when the parts are adjusted in the vertical plane to a position about half way between their limits of movement. This relationship will be maintained substantially throughout all positions of adjustment, whereas the telescoping connections 46 and 48 with the internal splines 38 will permit what slight variations there are in distance between the flanges 62 and 64 without binding of the parts during operation.

In order to make efficient operation of the elevator possible, the universal joints 40 and 42 are provided with the flight 50 which makes it apparent that the grain coming from the drag section 26 will be picked up by this flighting and delivered to the inlet end of the main elevator section 10. The canvas boot 52 encloses the universal joints and their flighting 50 and thus provides grain pick-up by the flighting on the universal joints and delivery thereof to the lower end of the elevator 10 from which it is removed by the elevator and delivered to the final location whether it be a grain bin, truck or whatever other receptacle may be used. Without the flighting on the universal joint, a conveyor of this general type has been found to be very inefficient but with the flighting it operates very efficiently with little loss either of energy or in cracked grain.

Prior to my invention, the use of a swinging auger was possible only in case the grain was moved by the drag section upward and into an auxiliary hopper and from this second hopper was moved through the elevator. The present device eliminates this auxiliary hopper together with any open delivery of grain from the end of one elevating device into the hopper, and the requirement that it be picked up again in the second hopper. This makes for greater efficiency and in addition the grain is always enclosed in the boot, thus preventing the entry of dirt or other foreign matter during the elevating operation. The supporting ring in the boot keeps it out of contact with the flighting but still provides free space into which the grain may be delivered by the drag auger 34.

Some changes may be made in the construction and arrangement of the parts of my jointed conveyor without departing from the real spirit and purpose of my invention, and it is my intention to cover by my claims any modified forms of structure or use of mechanical equivalents which may reasonably be included within their scope.

I claim as my invention:

1. In a jointed conveyor, a pair of auger tubes each having an auger therein, adjacent ends of said tubes being spaced from each other, a flexible boot enclosing said adjacent ends, a double universal joint in said boot operatively connecting the ends of said augers together, said double universal joint including a center section connecting the two joints together, auger flighting on said center section to transfer material through said boot from one auger to the other, and a gimbal yoke connection between said auger tubes having vertical and horizontal axes substantially intersecting the center of said center section.

2. In a jointed conveyor, a pair of auger tubes each having an auger therein, adjacent ends of said tubes being spaced from each other, a flexible boot enclosing said adjacent ends, a universal joint in said boot operatively connecting the ends of said augers together, and a double-axis gimbal yoke connection between said auger tubes having vertical and horizontal axes intersecting each other at substantially the center of said universal joint.

3. In a jointed conveyor, a pair of auger tubes each having an auger therein, adjacent ends of said tubes being spaced from each other, a boot enclosing said adjacent ends and comprising a pair of flexible cone segments having their bases together, a supporting ring surrounding said bases, a flexible reinforcing strip surrounding said boot, overlying said supporting ring and having its side edges secured to said boot, said strip thereby confining said ring in position, a universal joint in said boot operatively connecting the ends of said augers together, auger flighting on said universal joint, and a gimbal yoke connection between said auger tubes having vertical and horizontal axes permitting universal adjustment of one auger tube relative to the other.

4. In a jointed conveyor, a pair of auger tubes each having an auger therein, adjacent ends of said tubes being spaced from each other, a flexible boot enclosing said adjacent ends and comprising a pair of cone segments having their bases together, a relatively rigid supporting ring at said bases, means for securing said ring to said cone segments, a universal joint in said boot operatively connecting the ends of said augers together, and a gimbal yoke connection between said auger tubes comprising vertical frame extending upwardly from one tube and having a vertical axis beyond the end of the tube, a pair of horizontal frames extending sidewise from opposite sides of the other tube and having a pair of aligned pivots constituting a horizontal axis, and an inverted U-shaped frame having pivotal connections at its extremities with said aligned pivots, said axes substantially intersecting the axis of said universal joint.

5. In a conveyor of the character disclosed, a pair of auger tubes each having an auger therein, adjacent ends of said tubes being spaced from each other, a flexible boot enclosing said adjacent ends, a universal joint in said boot comprising a pair of joint sections telescopically and non-rotatably connected to the adjacent ends of said augers and a center section, auger flighting on said center section to transfer material through said boot from one auger to the other, and a connection between said auger tubes having vertical and horizontal axes intersecting the center of said center sections to permit angular adjustment of said auger tubes relative to each other.

6. In a jointed conveyor, a pair of auger tubes each having an auger therein, adjacent ends of said tubes being spaced from each other, a flexible boot enclosing said adjacent ends, a universal joint in said boot operatively connecting the ends of said augers together, said universal joint comprising a pair of joint sections telescopically and non-rotatably connected to the adjacent ends of said augers and a center section, auger flighting on said center section, and a yoke connection between said auger tubes having vertical and horizontal center intersecting the axes of said center section.

7. In a jointed conveyor, a pair of auger tubes having augers therein, adjacent ends of said tubes being spaced from each other, a flexible boot enclosing said adjacent ends, a universal joint in said boot operatively connecting the ends of said augers together, auger flighting on said universal joint to transfer material through said boot from one auger to the other, and a gimbal yoke connection between said auger tubes comprising a vertical-axis bracket and horizontal-axis bracket secured to said tubes, a yoke for connecting said brackets together, and substantially vertical and horizontal axis connections between said yoke and said brackets.

8. In a jointed conveyor, a pair of auger tubes each having an auger therein, adjacent ends of said tubes being spaced from each other, a flexible boot enclosing said adjacent ends and comprising a pair of cone segments having their bases together, a supporting ring at said bases, a band surrounding said boot and overlying said supporting ring, a universal joint in said boot and comprising a pair of joint sections telescopically and non-rotatably connected to the adjacent ends of said augers, auger flighting on said universal joint, and a gimbal yoke connection between said auger tubes comprising vertical and horizontal frames secured to the respective tubes and having vertical and horizontal axes respectively, and an inverted U frame having its center and ends pivotally associated with said vertical and horizontal axes respectively.

9. In a jointed conveyor, a pair of auger tubes each having an auger therein, adjacent ends of said tubes being spaced from each other, a flexible boot enclosing said adjacent ends and comprising a pair of cone segments having their bases together, a supporting ring at said bases, a band surrounding said boot and overlying said supporting ring, a universal joint in said boot operatively connecting the ends of said augers together and including a center section, auger flighting on said center section, and a gimbal yoke connection between said auger tubes and comprising a pair of vertical-axis and horizontal-axis brackets secured to said tubes, a yoke for connecting said brackets together, and vertical and horizontal axis connections between said yoke and said brackets, said vertical and horizontal axis connections substantially intersecting the center of said center section.

10. In a conveyor of the character disclosed, a pair of auger tubes each having an auger therein, adjacent ends of said tubes being spaced from each other, a flexible boot enclosing said adjacent ends and comprising a pair of cone segments having their bases together, a supporting ring at said bases, a band surrounding said boot and overlying said supporting ring, a universal joint in said boot operatively connecting the ends of said augers together, said universal joint comprising a pair of joint sections telescopically and non-rotatably connected to the adjacent ends of said augers, and a center section, auger flighting on said center section, a gimbal yoke connection between said auger tubes and comprising a vertical-axis bracket and a horizontal-axis bracket secured to said tubes, a yoke for connecting said brackets together, and vertical and horizontal axis connections between said yoke and said brackets.

References Cited in the file of this patent

UNITED STATES PATENTS

| | | |
|---|---|---|
| 697,653 | Norton | Apr. 15, 1902 |
| 701,936 | Roberts | June 10, 1902 |
| 1,732,721 | Horine | Oct. 22, 1929 |
| 2,092,134 | Oppenheim | Sept. 7, 1937 |
| 2,296,007 | Weisenberger | Sept. 15, 1942 |
| 2,548,134 | Turner | Apr. 10, 1951 |
| 2,830,695 | Fennimore et al. | Apr. 15, 1958 |